(12) United States Patent
Jostmeyer et al.

(10) Patent No.: US 7,934,199 B2
(45) Date of Patent: Apr. 26, 2011

(54) AUTOMATED OPERATION OF IT RESOURCES WITH MULTIPLE CHOICE CONFIGURATION

(75) Inventors: Bernd Jostmeyer, Weil im Schoenbuch (DE); Norbert Lenz, Magstadt (DE); Markus Mueller, Eutingen (DE); Wolfgang Schaeberle, Nutringen (DE)

(73) Assignee: International Business Machines Corporation, Armonk, NY (US)

( * ) Notice: Subject to any disclaimer, the term of this patent is extended or adjusted under 35 U.S.C. 154(b) by 1220 days.

(21) Appl. No.: 11/531,046

(22) Filed: Sep. 12, 2006

(65) Prior Publication Data
US 2008/0126793 A1    May 29, 2008

(30) Foreign Application Priority Data

Sep. 16, 2005 (EP) .................................. 05108551

(51) Int. Cl.
*G06F 9/44* (2006.01)
(52) U.S. Cl. ........ 717/121; 717/105; 717/113; 717/122; 717/123

(58) Field of Classification Search .................. None
See application file for complete search history.

(56) References Cited

U.S. PATENT DOCUMENTS 7,100,082 B2 *  8/2006  Little et al. .................... 714/26
7,100,083 B2 *  8/2006  Little et al. .................... 714/26

* cited by examiner

*Primary Examiner* — Chuck O Kendall
(74) *Attorney, Agent, or Firm* — Yee & Associates, P.C.; Jeffrey S. LaBaw

(57) ABSTRACT

A method and respective system for performing a reconfiguration of a plurality of resources, where the resources reside on multiple different system platforms including a mainframe with a policy-based automation manager. A reconfiguration method with an improved switching facility between such configurations is provided by using a predefined automation choice group as a part of a predetermined automation policy, pre-selecting one group member as preferred to be activated in case a predetermined automation choice group is determined for operation, providing a user interface for triggering a reconfiguration of the resources according to the automation policy, and initiating an automatic change from a first resource configuration into a second resource configuration when the trigger is actuated.

9 Claims, 8 Drawing Sheets

AUTOMATION POLICY DEFINITION TIME

FIG. 7

Figure 1:
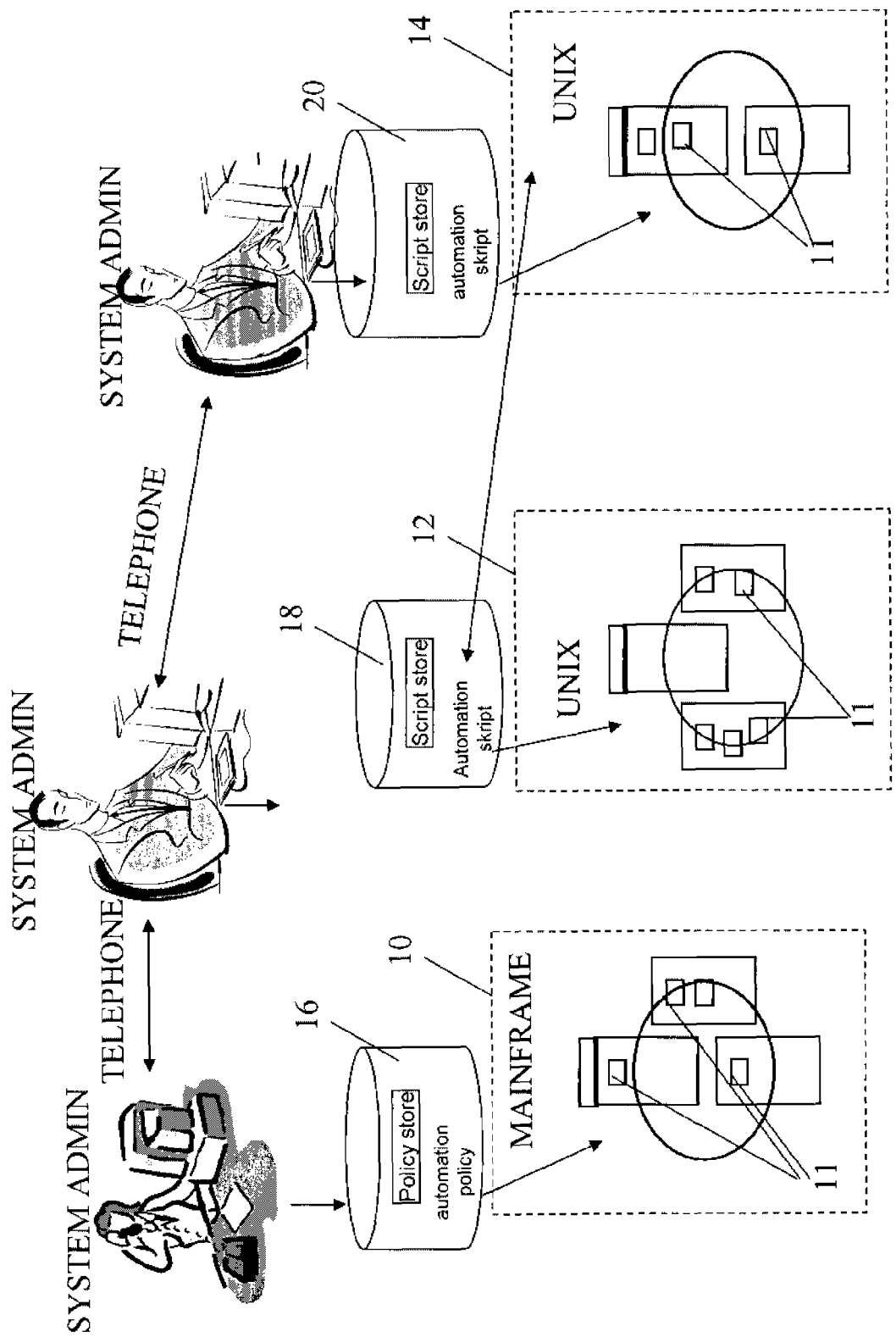

| Choice group | |
|---|---|
| Name: | Enterprise DB2 |
| Class: | ChoiceGroup |
| Automation domain: | FriendlyE2E |
| Owner: | Bob Owens, tel: 4312 |
| Info link: | http://www.google.de |
| Description: | Initial description |

Choice group status

☐ The resource works as desired

| | | |
|---|---|---|
| Observed state: | ⊕ Online | [ Request offline ] |
| Desired state: | ⊕ Online | [ Cancel request ] |
| | | [ View requests... ] |

Possible choices

Currently preferred choice: DB2 Production Server FEPLEX2/SYS1

| Select | Choice group members |
|---|---|
| ○ | ⚙ DB2 Backup Server FEPLEX1/SYS5 |
| ○ | ⚙ DB2 Backup Server FEPLEX1/SYS6 |
| ⦿ | ⚙ DB2 Production Server FEPLEX2/SYS1 |

Change preferred choice to:

DB2 Production Server
FEPLEX2/SYS1                                [ Set as preferred ]

FIG. 8

Choice group

| | |
|---|---|
| Name: | Enterprise DB2 |
| Class: | ChoiceGroup |
| Automation domain: | FriendlyE2E |
| Owner: | Bob Owens, tel: 4312 |
| Info link: | http://www.google.de |
| Description: | Initial description |

Choice group status

☐ The resource works as desired

| | | | |
|---|---|---|---|
| Observed state: | ↑ Online | | Request offline |
| Desired state: | ↑ Online | | Cancel request |
| | | | View requests... |

Possible choices

Currently preferred choice: DB2 Production Server FEPLEX2/SYS1

| Select | Choice group members |
|---|---|
| ○ | DB2 Backup Server FEPLEX1/SYS5 |
| ⦿ | DB2 Backup Server FEPLEX1/SYS6 |
| ○ | DB2 Production Server FEPLEX2/SYS1 |

Change preferred choice to:

DB2 Backup Server FEPLEX1/SYS6

Set as Preferred

FIG. 9

Choice group

| | |
|---|---|
| Name: | Enterprise DB2 |
| Class: | ChoiceGroup |
| Automation domain: | FriendlyE2E |
| Owner: | Bob Owens, tel: 4312 |
| Info link: | http://www.google.de |
| Description: | Initial description |

Choice group status

☐ The resource works as desired

| | | | |
|---|---|---|---|
| Observed state: | ↑ Online | | Request offline |
| Desired state: | ↑ Online | | Cancel request |
| | | | View requests... |

Possible choices

Currently preferred choice: DB2 Backup Server FEPLEX1/SYS6

| Select | Choice group members |
|---|---|
| ○ | DB2 Backup Server FEPLEX1/SYS5 |
| ⦿ | DB2 Backup Server FEPLEX1/SYS6 |
| ○ | DB2 Production Server FEPLEX2/SYS1 |

Change preferred choice to:

DB2 Backup Server FEPLEX1/SYS6                    Set as preferred

AUTOMATED OPERATION OF IT RESOURCES WITH MULTIPLE CHOICE CONFIGURATION

1. BACKGROUND OF THE INVENTION

1.1. Field of the Invention

The present invention relates to the field of operation of Information Technology (IT) resources, and the area of automation software. In particular, it relates to a method and respective system for performing a reconfiguration of a plurality of resources, wherein said resources reside on multiple different system platforms including mainframe and distributed systems, with a policy-based automation manager.

1.2. Description and Disadvantages of Prior Art

The present invention can be best applied in enterprises having a relatively large and sophisticated IT-infrastructure, in particular those enterprises which should guarantee a high degree of system availability. A typical example is a bank and the associated IT-environment comprising a mainframe, diverse banking applications running on the mainframe, a plurality of distributed systems running on a UNIX platform and including web servers and respective web applications.

In this disclosure we use the term automation software for software, which automates operator tasks for the purpose of continuous or high application availability.

Within those enterprise computing centers dedicated to support the IT infrastructure, human operators are employed to keep these diverse applications up and running. In order to achieve high levels of availability, software programs—typically called "automation software"—are used to support the operators.

In a functional view prior art automation software often can handle two different scenarios:

Planned scenarios, where an application and the IT resources, e.g., any hardware, software, and processes implemented therein and supporting the application must be stopped, moved, restarted etc. in an effective way for maintenance purposes or for other planned purposes like performing tests etc., or unplanned scenarios, where an application and the respective IT resources fail and must be automatically moved, restarted etc., in an effective way to minimize the impact of the outage.

In a IT-system view the prior art automation software splits up in a script-based and a policy-based approach:

Scripts are often written by a system application programmer or by system administrator staff to implement the desired automation support. A drawback of the script-based approach is that any change in hardware, operating system, middleware or application setup results in very labor-intensive updates and tests of the automation scripts.

Software vendors sell automation products, which typically have to be customized before they can be used to automate IT resources. These vendor automation products are also often script based. This means, that the system administrator staff must write script plug-ins to implement the desired automation support. Here, the drawbacks are identical to that ones described above.

Other vendor automation software is policy-based. In this context an "automation policy" is an abstract configuration description of the application and the IT resources needed to run the application. A prior art automation policy typically consists of "grouping concepts" and of relationships. In comparison to the script-based approach the policy-based approach has benefits. It is easy to adapt to changes in hardware, operating system, middleware or application setup, because only a few changes in the automation policy definition are needed to reflect a new configuration.

With particular respect to the present invention most automation vendor products (script-based or policy-based) do not support cross-cluster or cross-platform automation. When automating unplanned scenarios, automation software typically runs in a homogeneous, clustered environment only, or on a single node only. If external resources need to be automated, often a simple script mechanism with remote execution is used to provide rudimentary cross-cluster or cross-platform support. This however, is not sufficient to support a transit from one configuration to another, for example for test purposes, as the remote platform or remote cluster is too complex for being able to be re-configured by a simple and short piece of script.

Policy-based automation products support exemplarily the following group concepts:

Basic group: a group of resources—see resources 11 in FIG. 1, which is available if and only if all members of the group are available.

Server group: a group of resources 11, which is available if and only if the number of available members is larger than a given threshold number.

Move group: a group of resources 11, which is available if and only if exactly one of the members is available; when a system hosting one of the members fails, another member of the group hosted on a different system is started automatically.

It should be noted that different automation products use different names for the above groups, while they still keep the above described semantics.

With reference to FIG. 1 a schematic prior art system view is given. An enterprise may be assumed to have an IT-infrastructure comprising a mainframe cluster (e.g. a IBM-zSeries sysplex) 10 and two further UNIX clusters 12 and 14. Mainframe automation as described above is based on an automation policy stored in a policy store 16. The automation of the UNIX clusters 12, 14 is based on automation scripts stored in respective script stores 18, 20.

Enterprise-level reconfigurations including diverse platforms—e.g. mainframe 10, UNIX 12, 14, maybe WINDOWS—are mostly planned operations. They are typically performed by human operators depicted in the upper part of FIG. 1. Often multiple operators work together, if their skill is platform-specific and different platforms are involved.

This is depicted in FIG. 1. In sophisticated IT enterprises, the human operator can not foresee what a consistent configuration is and which other configurations can be selected alternatively and under which conditions they can be selected. Thus, enterprise-level reconfigurations of resources 11 takes much time as all configuration work must be agreed—often accompanied by long telephone calls—on between the respective system administrators before it is performed.

This is highly relevant for mission-critical applications like banking environments. About 70% of important data such as financial transfer data in banking application reside still on mainframes, although with the increasing relevance of Web-based services, enterprises increasingly have implemented UNIX-based servers and WINDOWS-based systems. But as a mainframe platform offers a proven, trusted, and quite stable long-time performance in particular with huge amounts of data, they represent the backbone in a banking IT infrastructure. Thus, heterogenous IT infrastructures, comprising the main frames and UNIX based systems coexist and are subjected to above-described reconfiguration scenarios. Disadvantageously, prior art automation software, however, is not able to offer a consistent, error-free support for configuration changes across the different platforms, or across different clusters.

1.3. Objectives of the Invention

It is thus an objective of the present invention to provide a reconfiguration method with an improved switching facility between such configurations.

2. SUMMARY AND ADVANTAGES OF THE INVENTION

This objective of the invention is achieved by the features stated in enclosed independent claims. Further advantageous arrangements and embodiments of the invention are set forth in the respective subclaims. Reference should now be made to the appended claims.

According to the broadest aspect of the invention a method for performing a reconfiguration of a plurality of resources with a policy-based automation manager is disclosed, wherein the resources reside on multiple different clusters or different system platforms including a mainframe, and wherein interdependencies exist between at least two resources of different platforms, which is characterized by the steps of:

a) defining an automation choice group construct as a part of a predetermined automation policy, wherein the automation choice group construct describes a group of software configuration alternatives having at least two different members, and each member represents a set of alternative resource configurations, wherein at most one member is allowed to be active at a time, b) pre-selecting one group member as "preferred" to be activated in case a predetermined automation choice group is determined for operation, c) providing a user interface for triggering a reconfiguration of the resources according to said automation policy, and d) initiating an automatic change from a first resource configuration into a second resource configuration, when the trigger is actuated.

The present invention aims to provide a mechanism for supporting the operator efficiently in complex reconfigurations, where multiple choices of alternative configurations are available, but only one choice may be active at any given point in time. Examples are, when a complex business application has to be moved to a test environment, or when a business application runs in a standard configuration, but on certain occasions it has to be moved to a predefined backup configuration. These reconfigurations can be complex, because they may imply cross-cluster operations or even cross-platform operations.

Furthermore a means is provided to pre-define such configurations by a system administrator and have the operator only pull the switch to change from one configuration to the other.

This disclosure describes a solution, which is implemented to support cross-cluster operations and cross-platform operations. But the principle described here is also applicable in other contexts, e.g. within a cluster or within a system.

It should be noted that in a more general view an automation choice group has a selection mechanism associated, which defines the preferred member when the group itself should get online. There are multiple implementation options here. One option is a preference count, or the group is structured as an ordered list, or a simple flag (true and false) is provided to mark the selected member. A "preferred"-attribute flag is proposed therefore in particular as it might be considered the most natural syntax supporting a human operator, because it does not define a priority order. With this selection mechanism it makes sense not to activate the choice group when the selected member cannot be activated.

When further, in said high-level automation manager component, abstract configuration names are used, and a adapter local-association is defined mapping an abstract configuration name to platform specific resource names and configuration scheme, then that name changes in a platform do advantageously not affect the definitions in the high-level automation manager.

3. BRIEF DESCRIPTION OF THE DRAWINGS

Figure 2:
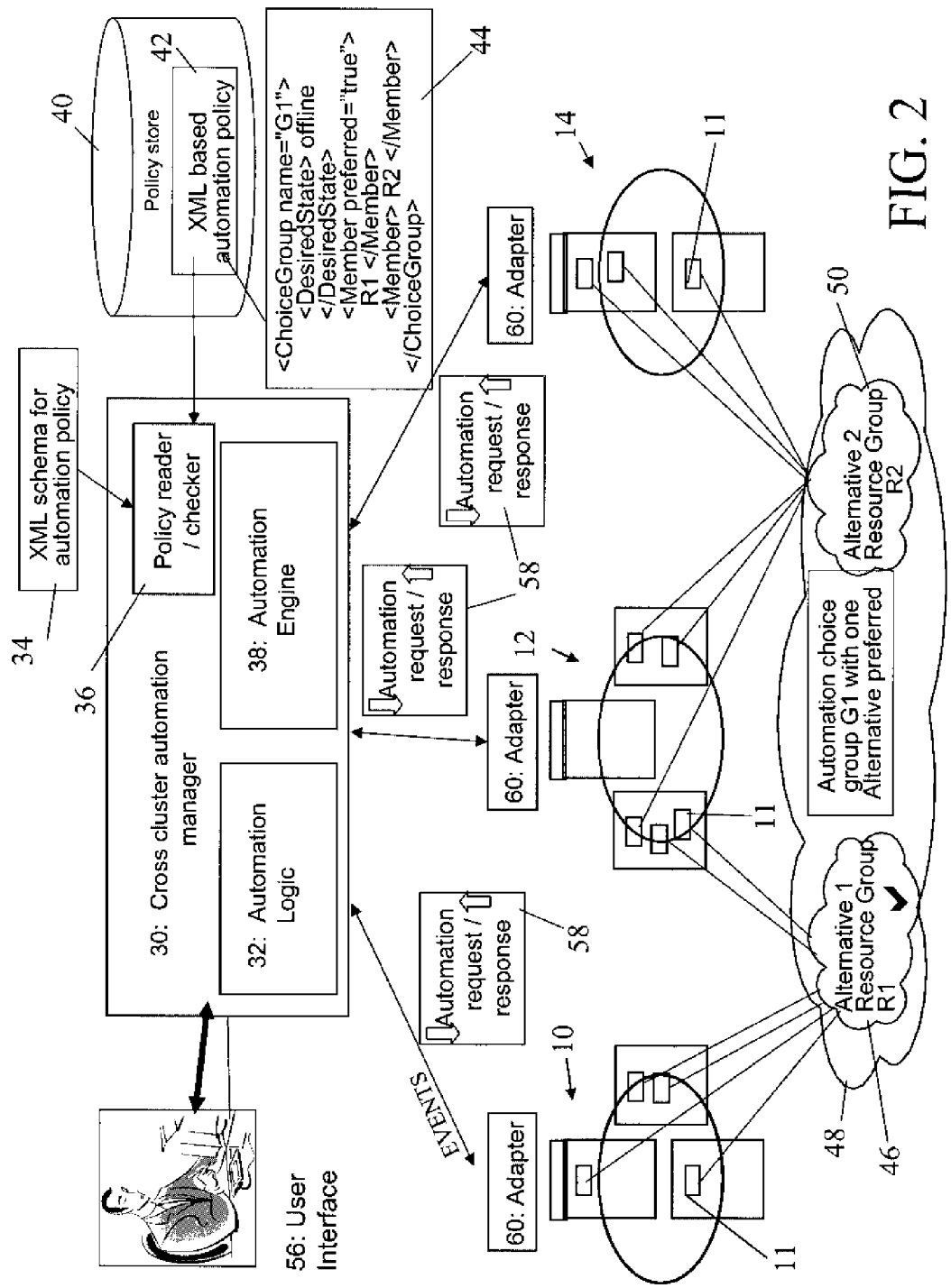
Figures 3, 4:
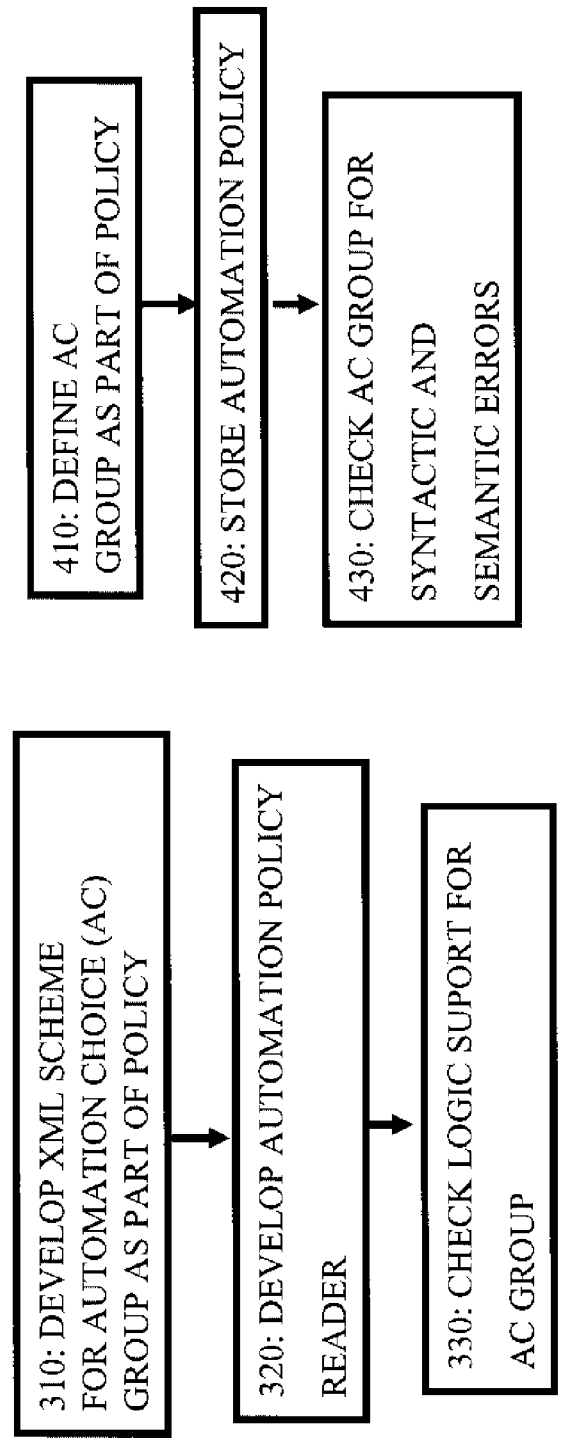
Figure 5:
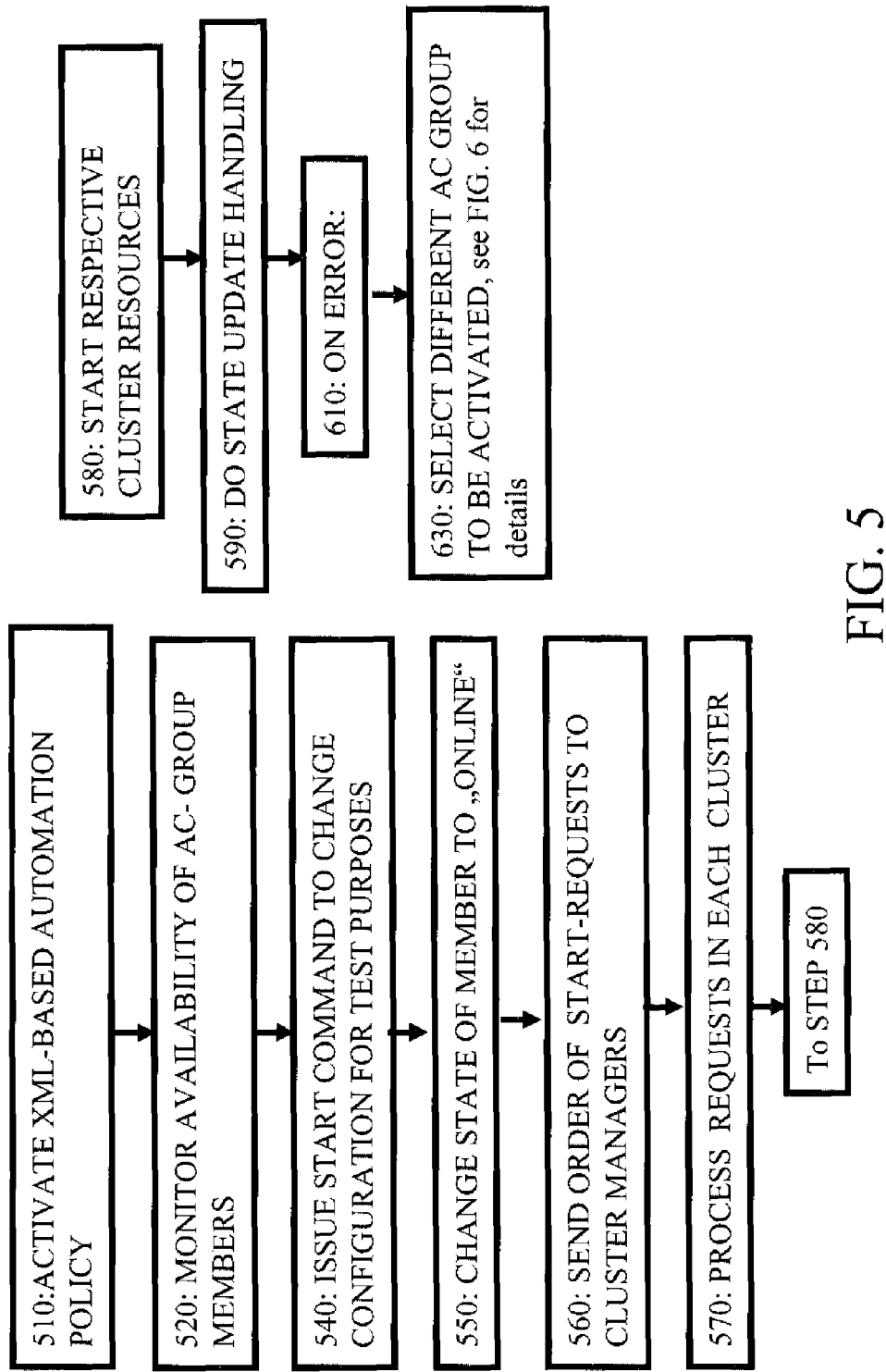
Figure 6:
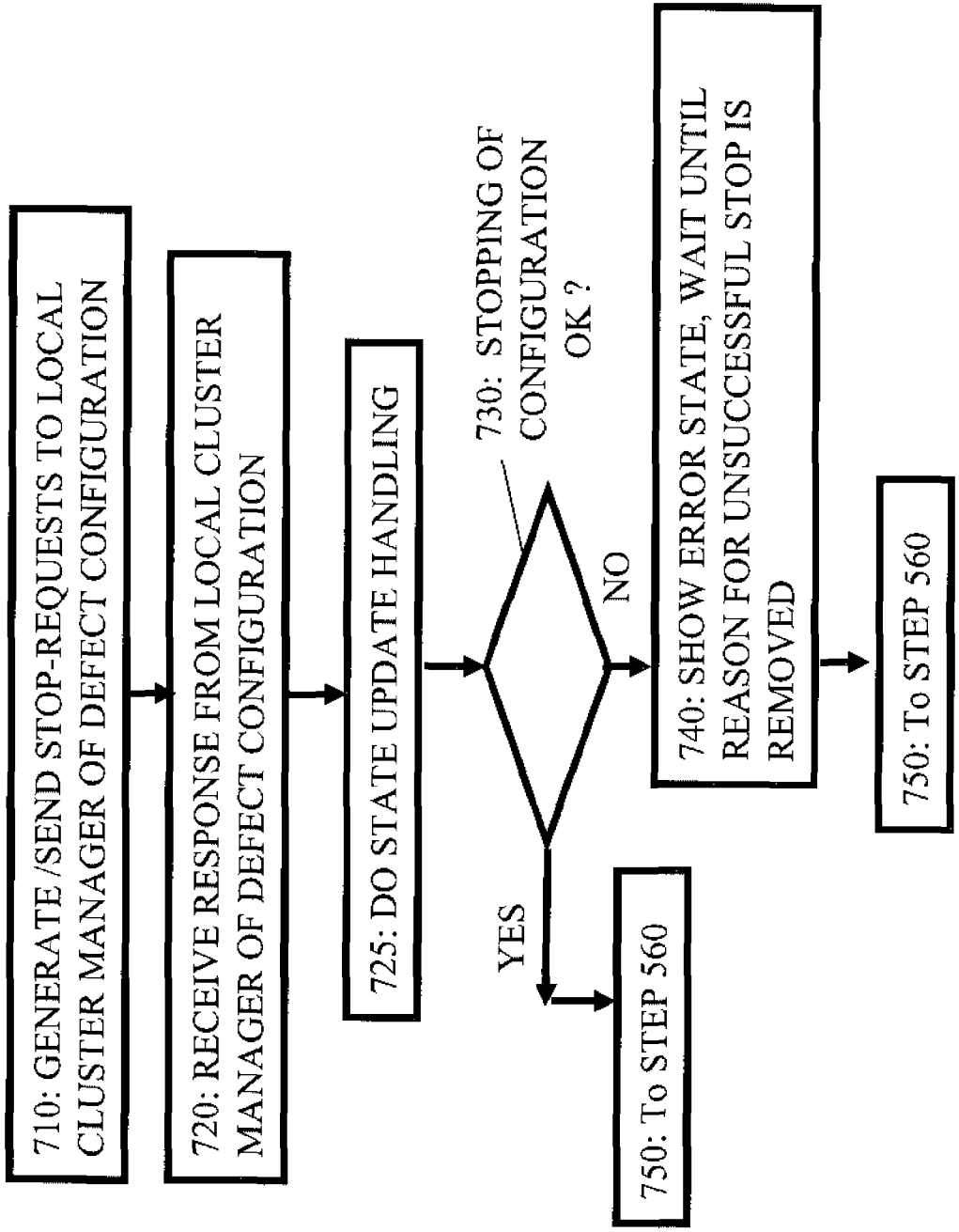

The present invention is illustrated by way of example and is not limited by the shape of the figures of the drawings in which:

FIG. 1 is a schematic system view on a prior art IT-environment having a plurality of resources 11 with interdependencies between each others and hosted on different platforms, including a mainframe cluster and UNIX clusters, FIG. 2 is a system view according to FIG. 1 improved by a preferred embodiment of the present invention resulting in a simpler reconfiguration of resources 11, FIG. 3 depicts the essential steps required when an automation product implementing the inventional method according to a XML-implementation is developed, FIG. 4 depicts the essential steps when an automation policy is developed which shall be effective on the mainframe cluster and on the UNIX clusters depicted in FIG. 1 or FIG. 2 according to a preferred embodiment of the present invention, FIG. 5 is a schematic control flow diagram depicting the main steps performed during runtime of a preferred embodiment of the inventional method, FIG. 6 is a control flow diagram showing some details of step 630 in FIG. 5, FIG. 7 depicts detailed information about the automation choice group and the possible configuration alternatives, FIG. 8 depicts detailed information about the automation choice group which is used to switch to one of the configuration alternatives, and FIG. 9 depicts the final result of the re-configuration of the automation choice group.

4. DETAILED DESCRIPTION OF THE PREFERRED EMBODIMENT

With general reference to the figures and with special reference now to FIG. 2 a preferred embodiment of the inventional method and system comprises an XML-based automation policy 42 the content of which is symbolised by an exemplary XML-implementation in frame 44. This XML-code implements an inventional automation choice group as a part of an XML-based automation policy. This policy 42 is stored in a policy store 40 located somewhere in the network and being accessible by an operator and his interface 56.

Further, an XML-schema 34 is depicted, which describes permissible XML-based automation policy elements and is used to validate the correctness of the XML-based automation policy 42.

In more detail, a policy reader 36 is functionally connected to the automation policy 42, in order to have a read and possibly a write access to the policy store 40, in order to read and check an automation policy for syntactic and semantic errors.

With respect to the centre portion of FIG. 2 a so-called cross-cluster automation manager 30 is a software component comprising an automation logic 32 and an automation engine 38. This manager component sends automation requests depicted with reference number 58 to a respective cluster 10, 12, or 14, i.e. the mainframe cluster and the UNIX clusters. Such a request comprises code or at least interpretable commands having the semantic meaning to start or to stop, or to move etc., an application resource or a group of application resources 11 in a respective cluster. Further, the automation manager 30 has respective I/O interfaces for receiving responses from the clusters telling the manager whether a request was successful or not.

It should be added that the adapter software 60 residing at each cluster is the interface software, which interprets the requests sent by automation manager 30 and interprets the commands comprised thereof, in order to address single resources 11 in a respective cluster. This function is executed locally at each cluster, based on a mapping between the more general commands received by the automation manager to the particular, specialised hardware and software component names residing in each cluster. Thus, assume a software component changes its name the new name is managed by adapter 60 in order to guarantee that a general command sent by the cross cluster automation manager 30 may be interpreted and correctly understood by adapter software 60.

Any state changes in each of the different clusters are sent by a cluster-local automation software to the cross cluster automation manager. Such state changes are referred to as "events", and are depicted as bidirectional arrows in FIG. 2.

The cross cluster automation manager 30 allows monitoring the availability of distributed business critical applications running on multiple, possibly heterogeneous clusters, as depicted in FIG. 2 and allows automatically operating these distributed applications. Such operations include the above-mentioned functions of starting, stopping or moving some resources 11.

The before-mentioned automation engine 38 performs the logic function of an abstract reasoning engine. In particular, it processes policy information by reading and evaluating it with respective background algorithms, listens to triggers such as resource state change events, to operator commands, or to scheduler-driven actions, or other events; it generates the above-mentioned automation requests and supervises the respective responses from a respective cluster 10, 12 and 14.

The automation logic 32 implements the semantics of the automation policy constructs in the automation engine 38 in an adequate format and programming language.

The local automation policies for the clusters 10, 12, 14 themselves are not required to be changed in order to be able to implement the invention. The only interface to the inventional part of the high-level cross cluster automation manager software is a respective adapter software 60.

With respect to the bottom portion of FIG. 2 a frame 48 contains an exemplary automation choice group G1 comprising two alternative resource groups R1 depicted as 46 and alternative 2 specifying a second resource group R2 50. Alternative 46 represents a distributed application or a part of it, as a typical example the default production (i.e. not being in a test mode) application.

Alternative 2 represents the same distributed application or a part of it, but in a test application. For both alternatives 46 and 50 there is an important principle valid: at any given point in time at most a single instance of a respective application, be that production application or test application—can be running.

The automation choice group G1 48 defines one of the two alternatives 46 or 50 as a "preferred alternative".

It should be added that the different system clusters, for example mainframe cluster and distributed UNIX clusters comprise a local automation as already mentioned before. Further, the user interface 56 is preferably a GUI which is used by an operator in order to monitor and automatically operate the distributed applications. More details are described further below.

As a concrete example, let us assume that resource group R1 corresponds to a distributed banking application in its production configuration. R1 itself can be a basic resource group as described before, containing resource groups for a set of HTTP Servers, a Web Application Server and Database Server. These mentioned groups in turn can contain resources like processes, IP addresses, file systems, disks etc. These resources can be automatically started and stopped, and there may be dependencies like start-order or stop-order. Also these resources have a location (a system or a node) where they may run.

To continue the example, let us assume that resource group R2 corresponds to an updated version of the distributed banking application in its test configuration. R2 itself can again be a basic resource group, containing resource groups for a HTTP Server, a Web Application Server and Database Server. Note that these resource groups may be different in the sense that they contain e.g. fewer HTTP servers, use a different database, contain a modified web application etc. These mentioned groups in turn can contain resources of the same type as described above, but also different types. Some of these resources will typically run on different locations, e.g. in a test environment on test systems.

In this example, critical tests cannot be performed in parallel to production since some of the production resources are needed for the test. Therefore a complex reconfiguration is necessary before the test can be performed. This typically happens under extreme time pressure, since production may not be halted for a long period of time.

Other examples are, where R1 is a default distributed software configuration, and R2 is a backup or a maintenance distributed software configuration.

In order to specify an automation choice group as part of an automation policy, the following things should be specified in this exemplary implementation:

First, the name of the automation choice group, which must be unique in the domain of automated resources 11 managed by a policy-based automation product.

Second, the desired state of the automation choice group. If the desired state is specified as "online", the automation choice group will be started by the policy-based automation product as described below. It is possible to define the desired state as an optional attribute, where the default value is e.g. "online".

Third, a set of one or more members, which are contained in the automation choice group. The members are specified with their respective unique names. The uniqueness of the names guarantees, that the different members can be identified uniquely while stopping or starting, i.e. instantiating the different alternatives Fourth, every member has a "preferred"—attribute. The default value of the "preferred"—attribute is "false". Exactly one member of the automation choice group must have a "preferred"-attribute with the value "true".

If the automation policy is coded in XML, an automation choice group can be specified in the following way:

Example:

```
<ChoiceGroup name="G1">
    <DesiredState> online </DesiredState>
    <Member preferred="true"> R1 </Member>
    <Member> R2 </Member>
</ChoiceGroup>
```

With additional reference to FIGS. 3 and 4 some preparative steps necessary to implement and run the inventional method are described as follows:

In a first preparative step 310 a software developer of an automation product implementing the present invention should develop an XML-scheme for an automation choice group as part of an XML-scheme for his particular automation policy. This can be done similar to the example given above.

In a next step 320 the developer develops an automation policy reader software component. This is done by implementing the main functions of reading the automation policy and checking for syntactical and semantical errors of the automation choice group defined in the XML-scheme.

Additionally a step 330 is done, in which the support of the automation logic 32 for the automation choice group is developed. It comprises the logic how to generate start and stop requests for an automation choice group depending on its preferred alternative and the logic to ensure, that at most one of the alternative members are online at any given point in time.

With further reference to FIG. 4 at definition time of the automation policy an application administrator or a system administrator defines an automation choice group 48 as part of the automation policy in a first step 410. Depending on how the customer wants to organize the operation of his IT applications, a set of application configuration alternatives are defined as an automation choice group by the application administrator.

In a next step 420 the automation policy is stored in the policy store 40, see FIG. 2. Then, in a next step 430 the system administrator checks the automation choice group for syntactic and semantic errors. This includes to control the logical names of any resources 11 in use, detect loops in resource relationships, etc.

Next and with reference to FIG. 5 the runtime behaviour of an inventional automation choice group implemented in a preferred embodiment of the invention will be described in more detail next below:

When in a policy based automation product an automation policy is activated, all groups or resources 11 are activated according to their specified desired state. When the desired state of an automation choice group is "online", the member with the attribute "preferred"="true" will be started by the automation product.

If the started member goes down it will be restarted in place. After several retries the automation choice group will go into some broken state. The operator will have to handle this. The operator has following two alternatives to choose from:

1. He can try to fix the problem with the current preferred member. It will start again and the group changes back into an "online" state.
2. He selects an alternative member to be activated. This ensures the service to be given by the choice group while giving the operator time to fix the problem with the former preferred member.

In case of a failure, there is no automatic activation for an alternate configuration. This is due to the fact, that selecting an alternate configuration, possibly on a different cluster or incorporating a multi-platform move in a heterogeneous environment must be triggered by a human operator.

The reconfiguration of an automation choice group is very simple for an operator. With an adequate user interface 56 the preferred member of the automation choice group can be changed with a mouse-click. When the desired state of the automation choice group is "online", the previously selected member of the automation choice group will be stopped. After that the newly selected member with the attribute "preferred"="true" will be started by the inventional automation product.

In more detail the following steps are performed:

In a first step 510 the operator activates XML-based a particular automation policy 42 in the cross-cluster automation manager 30, wherein he implicitly uses the before-mentioned policy reader/checker 36 to check for syntactic and semantic errors.

In a next step 520 the automation engine 38 monitors the availability of e.g. an application choice group 48 with one alternative 46 of a distributed application, e.g. the default production application preferred; of course, also only a part of the application may be concerned by that monitoring. It should be noted that at any given point in time maximally one instance of the application can be running; for sake of this example let us assume, that at the beginning the desired state is "offline".

At a given time, an operator decides to start the automation choice group.

With step 540, the operator uses the GUI-interface 56 and issues a start request for the application choice group 48. By that the "preferred flag" is set at a different alternative. Then the automation manager 30 changes the desired state to "online", step 550;

Then the automation engine 38 generates start-requests 58 in the right order, which are sent by the cross cluster automation manager 30 to the cluster(s) 10, 12 14, step 560.

In a cluster-local processing step 570 a respective inventional adapter software receives the requests, maps the semantic contained in the request to pre-defined automation rules, which are performed with cluster-local automation software. In that processing the preferred alternative 46 of a distributed application for example is started, see step 580.

The automation engine 38 checks the "observed" state and "operational" state and updates the user interface 56 accordingly; see the state handling step 590.

At a given time, e.g. if the application choice group 46 signals an error, see step 610, because the preferred alternative 46 has failed or e.g. for maintenance purposes, the operator selects in step 630 another alternative 50 of the distributed application, e.g. the test application in form of clicking on the alternative resource group R2, denoted as 50. Also here, at any given point in time maximally one instance of the application is allowed to be running.

Thus, the GUI-control of the automation manager 30 resets the new selection (12) as "preferred"—step 630—, i.e. switches from the previously selected alternative 46 of the distributed application in question, e.g. the default production application, to the now selected alternative 50 of the distributed application, e.g. the test application; also here a constraint is valid that at any given point in time maximally one instance of the application can be running; this complex configuration change should be performed within minimal time without any operator errors.

In particular, and with reference to FIG. 6, the automation engine 38 generates stop-requests 58—step 710 in the right order for application resources 11 belonging to the previously selected alternative 46, which are sent by the cross-cluster automation manager 30 to the cluster(s) 10, 12, 14, where the previously selected alternative 11 of the distributed application is running.

The automation engine 38 checks the responses from the different clusters, received in step 720, if the stop-processing went well. Then the states of the configurations are updated in a respective state tracking log maintained by the manager 30, step 725.

If the stop processing did not go well (e.g. because a local operator has placed a higher priority request on some resources 11 to stay up and running), then the application choice group goes into an error state. The details of these state changes are described below. After the reason for the unsuccessful stop has been removed, the automation engine 38 will detect these state changes and automatically resume normal processing.

If correct stop-operation is observed then control is fed back to step 560, i.e., the automation engine 38 generates start-requests 58 in the correct order for application resources 11 belonging to the now selected alternative 50.

These start requests 58 are sent by the cross cluster automation manager 38 to the cluster 10, 12, 14, where the now selected alternative 50 of the distributed application may run, steps 570, 580. States are updated again, step 590.

The automation engine 30 then checks the observed state and operational state and updates the user interface 56 accordingly. For details of the state changes in the automation choice group, see the description later below.

At a later point in time, the operator may switch back from the alternative 50 to the alternative configuration 46. Here, respective steps can be performed in analogy to the description given above.

In the NO-branch of decision 730 the error state is shown and after the reason for the unsuccessful stop has been removed, the automation engine 38 will detect the state change and then control is fed back to step 560.

Sample Operator Interaction with an Automation Choice Group

This is an example using a web based GUI. In this use case an automation choice group has been defined for a database server configuration. This database server usually runs on a cluster called FEPLEX2 in a production environment. If the configuration of the production database on cluster FEPLEX2 has to be changed or the cluster/system on which the production database is located is no longer available for other reasons, the operator can switch to a backup configuration of that database server which is located on a different cluster called FEPLEX1.

Step 1: Display Automation Choice Group Information

FIG. 7 shows detailed information about the automation choice group and the possible configuration alternatives.

The first section entitled "Choice group" gives general information, such as the name of the automation choice group ("Enterprise DB2") and a description.

The next section "Choice group status" gives status information and gives an operator the capability to start ("Request online") or stop ("Request offline") the whole automation choice group.

The section "Possible choices" displays the configuration alternatives for the automation choice group:
DB2 Production Server on Cluster FEPLEX2
DB2 Backup Server on system SYS6 on cluster FEPLEX1
DB2 Backup Server on system SYS5 on cluster FEPLEX1

This section also displays which configuration is the one that is currently preferred and therefore "online". In this case it is the production database server on FEPLEX2. The other configuration alternatives are grayed out, which indicates that they are "offline".

Step 2: Change to Backup Configuration

The "Possible choices" section of FIG. 8 is used to switch to one of the configuration alternatives.

In this case the operator has selected the database server on SYS6 in cluster FEPLEX1.

Now, the operator clicks on the "Set as preferred" button, which changes the preferred configuration for this automation choice group to the selected choice.

The policy-based automation product will now shutdown the production database server on FEPLEX2 and start up the Backup Server on FEPLEX1 instead.

Result:

FIG. 9 shows the final result of the re-configuration of the automation choice group.

Now the backup database server on SYS6 in FEPLEX1 is the preferred choice for the automation choice group and this configuration is the one that has been brought "online" by the automation product.

Note that the configuration options (choices) of an automation choice group can be very complex applications with many sub-components by using application groups as members.

Next, the dynamic behavior of an automation choice group construct according to a preferred embodiment of the invention will be described in more detail.

Let us assume an automation choice group G1 with members R1 and R2 as defined in the example above. Note that R1 and R2 can be simple resources 11 like a process, but they can also be complex groups of resources 11 themselves.

According to this preferred embodiment the automation choice group G1 and both member resources 11 have an attribute "observed state", of which the values are e.g. "online", "offline", "starting", "shutting down", "unknown" (e.g. when the resource cannot be contacted), and possibly other values.

The observed state of the automation choice group G1 is proposed to be always identical with the observed state of the preferred choice. Assuming the preferred choice is R1, then the value of the observed state-attribute of the automation choice group G1 is equal to the value of the observed state-attribute of the resource group R1.

Let us assume that the "desired state" of G1 is "online". When the automation policy is activated, see step 510 in FIG. 5, the automation product checks, if the observed state of R1 is "online" and the observed state of R2 is "offline". If yes, the observed state of G1 is set to "online". If no, an "offline"-request is sent to R2, that means a command is issued in the request to set the resource group R2 out of operation, and if needed, an "online"-request is sent to R1, that means a command is issued in the request to set the resource group R1 into operation. If everything runs correctly, the observed state of R1 will be "online", the observed state of R2 will be "offline", and the observed state of G1 will be set to "online".

For a more detailed look at the state transitions of an automation choice group according to a preferred embodiment of the invention a triple of states is processed:
Desired state (values e.g. "online", "offline")
Observed state (values e.g. "online", "offline", "starting", "shutting down", "unknown")
Operational state (values e.g. "OK", "cannot start", "cannot stop", "error")

Let us assume that we start in State 1, where everything is "offline".

State 1:

TABLE 1

State 1. The choice group is offline

| | Desired State | Observed State | Operational State |
|---|---|---|---|
| R1 selected | offline | offline | OK |
| R2 | offline | offline | OK |
| G1 | offline | offline | OK |

Now let us assume, that an "online" request (as explained above) for G1 is issued e.g. by the operator, or by the policy based automation product. If everything runs well, a resulting "online" request for the selected member R1 is successfully executed, and the following State 2 is reached.

State 2

TABLE 2

State 2. The choice group has been started

| | Desired State | Observed State | Operational State |
|---|---|---|---|
| R1 selected | online | online | OK |
| R2 | offline | offline | OK |
| G1 | online | online | OK |

Let us again assume, that an "online" request for G1 is issued for example by the operator, or by the policy based automation product. But when the resulting "online" request for the selected member R1 is assumed to be unsuccessful, e.g. because the local operator prevented in some way that resource group R1 can be started, then the following State 3 is reached.

State 3

TABLE 3

State 3. The selected preferred member fails to start

| | Desired State | Observed State | Operational State |
|---|---|---|---|
| R1 selected | online | starting | cannot start |
| R2 | offline | offline | OK |
| G1 | online | starting | cannot start |

A transition from State 3 to State 2 is possible by removing the cause for the inability to start resource R1.

Similarly, if an "online" request for G1 is issued, but the resulting "online" request for the selected member R1 is unsuccessful e.g. because the resource R1 has an unrecoverable error, then the following State 4 is reached.

State 4

TABLE 4

State 4. The selected preferred member has an unrecoverable error

| | Desired State | Observed State | Operational State |
|---|---|---|---|
| R1 selected | online | offline | error |
| R2 | offline | offline | OK |
| G1 | online | offline | error |

A transition from State 4 to State 2 is possible by human intervention, for example by repairing the resource R1, followed by informing the policy based automation product, that the resource group R1 has been repaired and may now be automatically operated again. Next, configuration changes to resource group R2 are described:

In the case where state 4 was entered because of an unexpected failure of the currently selected preferred member R1, the operator might choose to switch over to the alternative member R2. This will change the state of G1 back to "online", thus ensuring the availability of the service provided by the group.

State 5

TABLE 5

State 5. An alternative has been selected after preferred member failed to be online

| | Desired State | Observed State | Operational State |
|---|---|---|---|
| R1 | offline | offline | error |
| R2 selected | online | online | OK |
| G1 | online | online | OK |

Now let us assume, that State 2 is reached.

When in G1 the selected resource is changed to R2, this will implicitly result in an "offline" request for resource R1 and after that in an "online" request for R2. If both requests are successful, State 6 is reached.

State 6

TABLE 6

State 6. An alternative resource has been selected.

| | Desired State | Observed State | Operational State |
|---|---|---|---|
| R1 (old selected) | offline | offline | OK |
| R2 selected | online | online | OK |
| G1 | online | online | OK |

If we assume again State 2, and in G1 the selected resource is changed to R2, with the implicit "offline" request for resource R1 being successful, but the implicit "online" request for R2 is failing due to e.g. an unrecoverable error, then State 7 is reached.

State 7

TABLE 7

State 7. New selected member failed to start.

| | Desired State | Observed State | Operational State |
|---|---|---|---|
| R1 | offline | offline | OK |
| R2 selected | online | offline | error |
| G1 | online | offline | error |

A transition from State 7 to State 6 is possible by human intervention (e.g. repairing the resource R2), followed by informing the policy based automation product, that the resource R2 has been repaired and may now be automatically operated again.

If we assume again State 2, and in G1 the selected resource is changed to R2, with the implicit "offline" request for resource R1 failing (e.g. because the local operator has placed a higher priority request on resource R1 to keep it "online"), then the following State 8 is reached. The new selected member cannot start, since as prerequisite the old member has to be stopped first.

State 8

TABLE 8

State 8. Old selected member cannot stop.

| | Desired State | Observed State | Operational State |
|---|---|---|---|
| R1 | offline | online | cannot stop |
| R2 selected | online | offline | cannot start |
| G1 | online | offline | error |

A transition from State 8 to State 6 is possible by removing the higher priority operator request on resource R1 that kept it online; then the implicit "offline" request for resource R1 succeeds, and also the implicit "online" request for resource R2 succeeds. But if the implicit "online" request for R2 is failing due to an unrecoverable error, then State 7 is reached.

The present invention can be realized in hardware, software, or a combination of hardware and software. An automation tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation;
b) reproduction in a different material form.

The invention claimed is:

1. A method for performing a reconfiguration of a plurality of resources with a policy-based automation manager, wherein said resources reside on multiple different system platforms including a mainframe, and wherein interdependencies exist between at least two resources of different platforms, comprising the steps of:
   a) defining an automation choice group construct as a part of a predetermined automation policy, wherein the automation choice group construct describes a group of software configuration alternatives having at least two different members, and each member represents a set of alternative resource configurations, wherein at most one member is allowed to be active at a time,
   b) pre-selecting one group member as "preferred" to be activated in case a predetermined automation choice group is determined for operation,
   c) providing a user interface for triggering a reconfiguration of said resources automation policy,
   d) initiating an automatic change from a first resource configuration into a second resource configuration, when said trigger is actuated.

2. The method according to claim 1, wherein a high-level automation manager software component is used for implementing step d), said manager component being connectable and having functional interfaces to a respective platform- or cluster-specific automation adapter in each of said multiple platforms, wherein said automation adapter receives requests to toggle from one to the other configuration.

3. The method according to claim 1, wherein in said high-level automation manager component abstract configuration names are used, and an adapter local-association is defined mapping an abstract configuration name to platform-specific resource names and configuration schemes.

4. The method according to claim 1, wherein a "desired" state, an "observed" state, and an "operational" state is assigned to each member with respective values.

5. The method according to claim 1, wherein the resources reside in different clusters, and a cluster is managed by a cluster-specific manager, and wherein said reconfiguration of resources includes a group member, specifying a cross-cluster reconfiguration of resources.

6. The method according to claim 1, wherein the resources reside in different clusters, and a cluster is managed by a cluster-specific manager, and wherein said reconfiguration of resources includes a group member, specifying an inter-cluster reconfiguration of resources.

7. The method according to claim 1, wherein said automation policy is encoded in XML.

8. A computer system for performing a reconfiguration of a plurality of resources with a policy-based automation manager, wherein said resources reside on multiple different system platforms including a mainframe, and wherein interdependencies exist between at least two resources of different platforms, having functional components for
   a) using a pre-defined automation choice group construct as a part of a predetermined automation policy wherein the automation choice group construct describes a group of software configuration alternatives having at least two different members, and each member represents a set of alternative resource configurations, wherein at most one member is allowed to be active at a time,
   b) pre-selecting one group member as "preferred" to be activated in case a predetermined automation choice group is determined for operation,
   c) a user interface for triggering a reconfiguration of said resources according to said automation policy, d) initiating an automatic change from a first resource configuration into a second resource configuration, when said trigger is actuated.

9. A computer program stored in a non-transitory computer readable medium for execution in a data processing system for performing a reconfiguration of a plurality of resources with a policy-based automation manager, wherein said resources reside on multiple different system platforms including a mainframe, and wherein interdependencies exist between at least two resources of different platforms, having functional components for
   a) using a pre-defined automation choice group construct as a part of a predetermined automation policy, wherein the automation choice group construct describes a group of software configuration alternatives having at least two different members, and each member represents a set of alternative resource configurations, wherein at most one member is allowed to be active at a time,
   b) pre-selecting one group member as "preferred" to be activated in case a predetermined automation choice group is determined for operation,
   c) providing a user interface for triggering a reconfiguration of said resources according to said automation policy,
   d) initiating an automatic change from a first resource configuration into a second resource configuration, when said trigger is actuated, when said computer program is executed on a computer.

* * * * *

UNITED STATES PATENT AND TRADEMARK OFFICE
CERTIFICATE OF CORRECTION

| | | |
|---|---|---|
| PATENT NO. | : 7,934,199 B2 | Page 1 of 1 |
| APPLICATION NO. | : 11/531046 | |
| DATED | : April 26, 2011 | |
| INVENTOR(S) | : Jostmeyer et al. | |

It is certified that error appears in the above-identified patent and that said Letters Patent is hereby corrected as shown below:

Title Page:
Item (75) please insert -- Andreas Schauberer, Ehningen (DE) -- after -- Wolfgang Schaeberle, Nutringen (DE) --

Signed and Sealed this
Sixteenth Day of June, 2015

Michelle K. Lee
*Director of the United States Patent and Trademark Office*